United States Patent
Sonoda et al.

(10) Patent No.: US 12,026,016 B2
(45) Date of Patent: Jul. 2, 2024

(54) DISPLAY DEVICE

(71) Applicant: SHARP KABUSHIKI KAISHA, Sakai (JP)

(72) Inventors: Tohru Sonoda, Sakai (JP); Masahiro Inuzuka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 198 days.

(21) Appl. No.: 17/789,341

(22) PCT Filed: Jan. 15, 2020

(86) PCT No.: PCT/JP2020/001005
§ 371 (c)(1),
(2) Date: Jun. 27, 2022

(87) PCT Pub. No.: WO2021/144873
PCT Pub. Date: Jul. 22, 2021

(65) Prior Publication Data
US 2023/0032985 A1 Feb. 2, 2023

(51) Int. Cl.
G06F 1/16 (2006.01)
H04M 1/02 (2006.01)

(52) U.S. Cl.
CPC ........ G06F 1/1652 (2013.01); H04M 1/0268 (2013.01); *G06F 1/1656* (2013.01)

(58) Field of Classification Search
CPC .......................... G06F 1/1652; H04M 1/0268
See application file for complete search history.

(56) References Cited

U.S. PATENT DOCUMENTS

| | | | |
|---|---|---|---|
| 9,733,671 B2* | 8/2017 | Lee | H05K 5/0017 |
| 10,416,724 B2* | 9/2019 | Lin | G06F 1/1616 |
| 10,534,400 B2* | 1/2020 | Wu | G06F 1/1652 |
| 11,880,241 B2* | 1/2024 | Zhao | H04M 1/0268 |
| 2015/0062525 A1 | 3/2015 | Hirakata | |
| 2017/0227807 A1 | 8/2017 | Hirakata | |
| 2019/0163007 A1 | 5/2019 | Hirakata | |
| 2019/0187752 A1* | 6/2019 | Lee | G02F 1/133305 |
| 2019/0286195 A1* | 9/2019 | Lin | H04M 1/0268 |
| 2020/0292872 A1 | 9/2020 | Hirakata | |
| 2021/0333611 A1 | 10/2021 | Hirakata | |
| 2023/0045043 A1* | 2/2023 | Fan | H04M 1/0268 |

FOREIGN PATENT DOCUMENTS

| | | |
|---|---|---|
| CN | 109979322 A | 7/2019 |
| JP | 2015-064570 A | 4/2015 |

* cited by examiner

*Primary Examiner* — Nidhi Thaker
(74) *Attorney, Agent, or Firm* — ScienBiziP, P.C.

(57) ABSTRACT

A display device includes a display panel and a reinforcement body. The display panel includes in at least a part thereof a flexible section that is flexible. The reinforcement body is attached to the flexible section. The reinforcement body includes a reinforcement main body, a dispersion medium, a plurality of particles, and an aggregation section. The reinforcement main body has an accommodation space overlapping the flexible section. The reinforcement main body is flexible. The dispersion medium is contained in the accommodation space. The plurality of particles are dispersed in the dispersion medium. The aggregation section aggregates the plurality of particles so as to form an aggregation layer in the accommodation space.

15 Claims, 11 Drawing Sheets

DISPLAY DEVICE

TECHNICAL FIELD

The disclosure relates to display devices.

BACKGROUND ART

Patent Literature 1, as an example, describes a foldable display device. The display device described in Patent Literature 1 includes: a flexible display panel; a first housing that supports a first section of the flexible display panel; and a second housing that supports a second section of the flexible display panel. The flexible display panel includes a bending section between the first section and the second section.

CITATION LIST

Patent Literature

Patent Literature 1: Japanese Unexamined Patent Application Publication, Tokukai, No. 2015-64570

SUMMARY

Technical Problem

There is a demand that the bending section of the display device described in Patent Literature 1 have improved resistance under pressing force (hereinafter, may be referred to as "press resistance").

The present disclosure has a primary object to provide a display device with excellent press resistance.

Solution to Problem

The disclosure, in an aspect thereof, is directed to a display device including a display panel and a reinforcement body. The display panel includes in at least a part thereof a flexible section that is flexible. The reinforcement body is attached to the flexible section. The reinforcement body includes a reinforcement main body, a dispersion medium, a plurality of particles, and an aggregation section. The reinforcement main body has an accommodation space overlapping the flexible section. The reinforcement main body is flexible. The dispersion medium is contained in the accommodation space. The plurality of particles are dispersed in the dispersion medium. The aggregation section aggregates the plurality of particles so as to form an aggregation layer in the accommodation space.

DESCRIPTION OF EMBODIMENTS

The following will describe an example of a preferred mode for carrying out the disclosure. Note however that the following embodiments are for illustrative purposes only. The disclosure is not limited at all by the embodiments.

Embodiment 1

Figure 1:
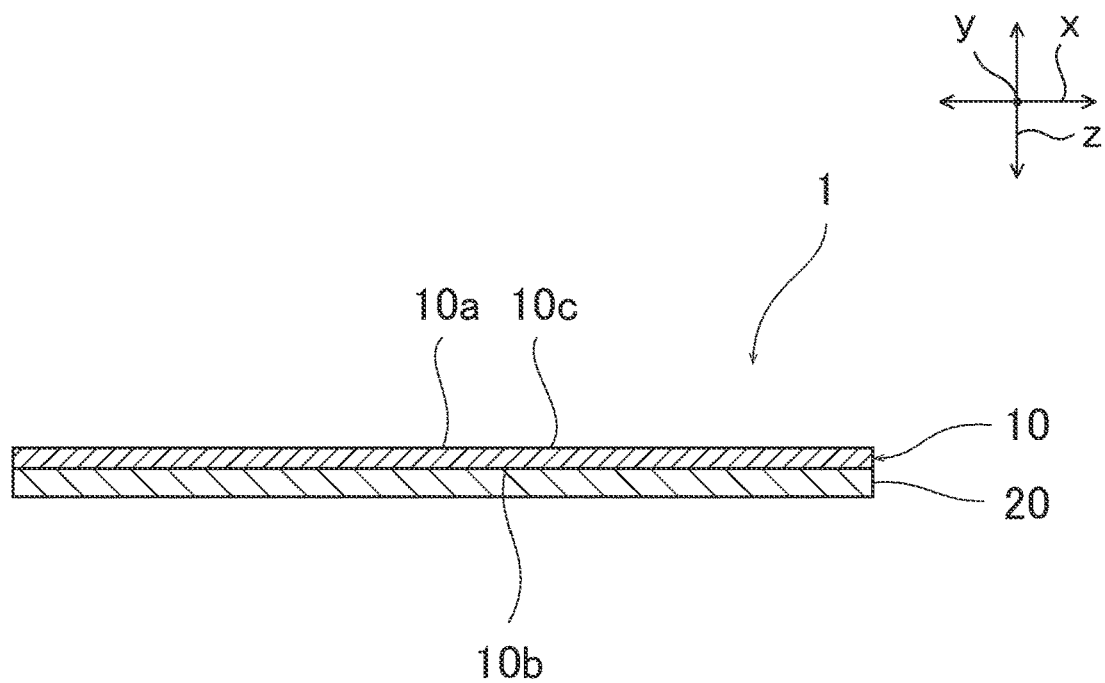
FIG. 1 is a schematic cross-sectional view of a display device in accordance with Embodiment 1.
Figure 2:
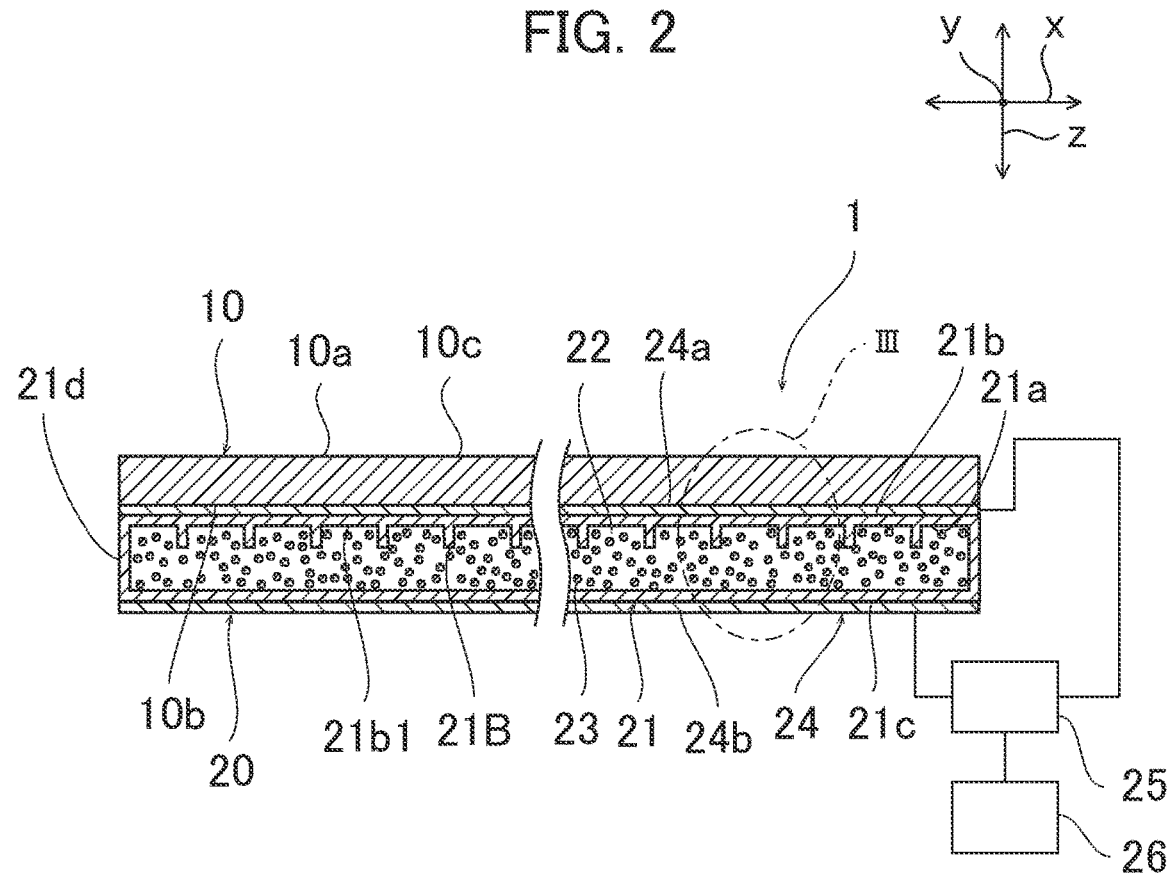
FIG. 2 is a schematic cross-sectional view of the display device in accordance with Embodiment 1.
Figure 3:
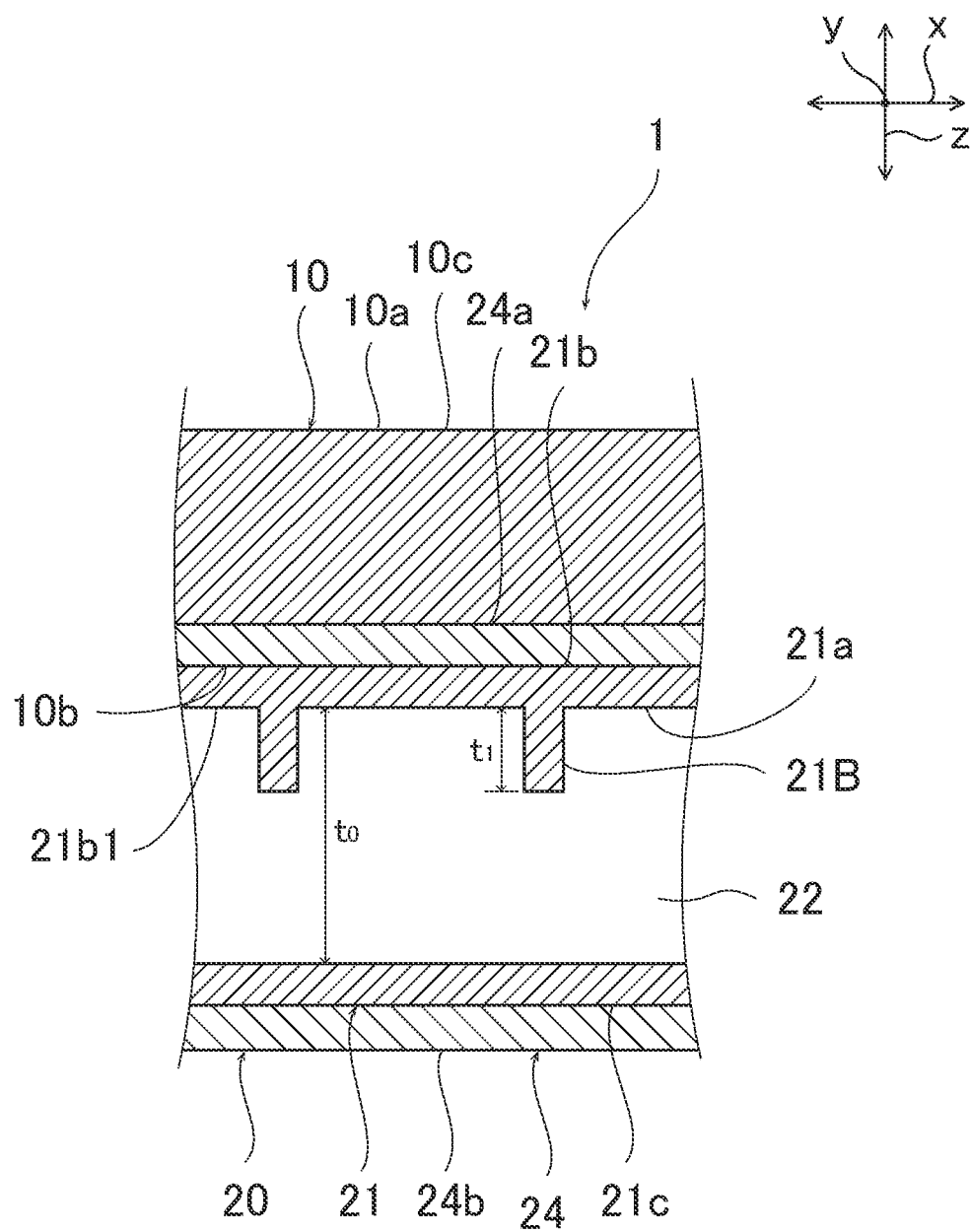
FIG. 3 is a schematic cross-sectional view of the portion encircled by dash-dot line III in FIG. 2.

FIG. 1 is a schematic cross-sectional view of a display device 1 in accordance with Embodiment 1. FIG. 2 is a schematic cross-sectional view of the display device 1 in accordance with Embodiment 1. FIG. 3 is a schematic cross-sectional view of the portion encircled by dash-dot line II in FIG. 2.

Referring to FIGS. 1 and 2, the display device 1 includes a display panel 10 and a reinforcement body 20.

Display Panel 10

The display panel 10 is not limited in any particular manner so long as the display panel 10 is at least partially flexible. The display panel 10 may be, for example, a self-luminous display panel. Specifically, the display panel 10 may be, for example, an OLED (organic light-emitting diode) display panel or a QLED (quantum dots light-emitting diode) display panel. Among these examples, the display panel 10 is preferably built around an OLED or QLED display panel in which a flexible section that is flexible can be easily formed. When the display panel 10 is a display panel equipped with a backlight, the backlight is preferably built around, for example, either one or both of an OLED and a QLED.

The display panel 10 is at least partially flexible. In other words, the display panel 10 includes, in at least a part thereof, a flexible section $10c$ that is flexible. The display panel 10 may be only partially constituted by the flexible section $10c$ or may be entirely constituted by the flexible section $10c$. Throughout the following description, the present embodiment assumes, as an example, that the display panel 10 is substantially entirely constituted by the flexible section $10c$.

The display panel 10 may have any shape in a plan view. The display panel 10 may be, for example, rectangular, polygonal, circular, elliptical, or elongated circular in a plan view. Throughout the following description, the present embodiment assumes, as an example, that the display panel 10 has a rectangular shape in a plan view.

The display panel 10 may have a touch panel function.

Reinforcement Body 20

The reinforcement body 20 is attached to the display panel 10 as shown primarily in FIG. 1. More specifically, the reinforcement body 20 is attached to the flexible section 10c of the display panel 10. The reinforcement body 20 is not necessarily attached to the entire flexible section 10c. The reinforcement body 20 may be attached to, for example, a part of the flexible section 10c. In other words, the reinforcement body 20 may not be attached to at least a part of the flexible section 10c. Specifically, in the present embodiment, the reinforcement body 20 is attached to the substantially entire display panel 10 included in the flexible section 10c.

More specifically, the reinforcement body 20 is disposed on a substantially entire second main face 10b located opposite from a first main face 10a that provides a light-exiting face for the display panel 10.

The reinforcement body 20 may be attached to the display panel 10 by any method. As an example, the reinforcement body 20 may be adhered to the second main face 10b of the display panel 10 using, for example, adhesive or may be affixed directly to the second main face 10b without using adhesive or like material. As another alternative, the reinforcement body 20 and the display panel 10 may be joined together by, for example, a plurality of fastening members. Throughout the following description, the present embodiment assumes, as an example, that the reinforcement body 20 is adhered to the substantially entire second main face 10b by an adhesion layer.

Details of Structure of Reinforcement Body 20

A detailed description is given next of a specific structure of the reinforcement body primarily with reference to FIG. 2.

The reinforcement body 20 includes a reinforcement main body 21, a dispersion medium 22, a plurality of particles 23, an aggregation section 24, a power supply 25, and a control section 26.

Reinforcement Main Body 21

The reinforcement main body 21 is provided in at least a part of an area in which the flexible section 10c is provided. Specifically, in the present embodiment, the reinforcement main body 21 is provided in a substantially entire area in which the flexible section 10c is provided.

The reinforcement main body 21 has an accommodation space 21a. The accommodation space 21a is provided so as to overlap at least a part of the flexible section 10c. Specifically, in the present embodiment, the accommodation space 21a is provided so as to overlap the substantially entire flexible section 10c.

To describe it in detail, the reinforcement main body 21 includes a first main wall section 21b, a second main wall section 21c, and a sidewall section 21d. The first main wall section 21b is provided along the flexible section 10c. The first main wall section 21b and the second main wall section 21c are positioned facing each other in the z-axis direction in which the display panel 10 and the reinforcement body 20 are stacked. The first main wall section 21b and the second main wall section 21c face each other with the accommodation space 21a intervening therebetween. The first main wall section 21b is disposed closer to the display panel 10 than is the second main wall section 21c. The peripheral portion of the first main wall section 21b and the peripheral portion of the second main wall section 21c are connected together by the sidewall section 21d which is provided so as to surround the accommodation space 21a. These first main wall section 21b, second main wall section 21c, and sidewall section 21d delimit the accommodation space 21a which is a closed space.

Of the first main wall section 21b, the second main wall section 21c, and the sidewall section 21d, at least the first main wall section 21b and the second main wall section 21c are flexible. The reinforcement main body 21 is therefore also flexible.

The first main wall section 21b, the second main wall section 21c, and the sidewall section 21d may be made of any substance. The first main wall section 21b, the second main wall section 21c, and the sidewall section 21d may be each made of, for example, resin or metal.

Protrusion 21B

The first main wall section 21b has a protrusion 21B on a surface 21b1 thereof on a side of the accommodation space 21a. The protrusion 21B protrudes from the surface 21b1 toward the second main wall section 21c. The protrusion 21B extends in the z-axis direction.

FIG. 3 is a schematic cross-sectional view of the portion encircled by dash-dot line III in FIG. 2. Note that FIG. 3 omits the particles 23.

The protrusion 21B has a height $t_1$ (dimension in the z-axis direction) that is preferably less than or equal to half of the thickness to (dimension in the z-axis direction) of the accommodation space 21a ($t_1 \leq (1/2) \cdot t_0$) when the flexible section 10c is platelike and that is more preferably less than or equal to one third of that thickness to. The height $t_1$ of the protrusion 21B is preferably greater than or equal to 10 times the average particle diameter of the particles 23 and more preferably greater than or equal to 30 times that average particle diameter.

Note that the protrusion 21B does not necessarily have a rectangular lateral cross-sectional shape. The lateral cross-sectional shape of the protrusion 21B may be, for example, trapezoidal, triangular, or domical.

Figure 4:
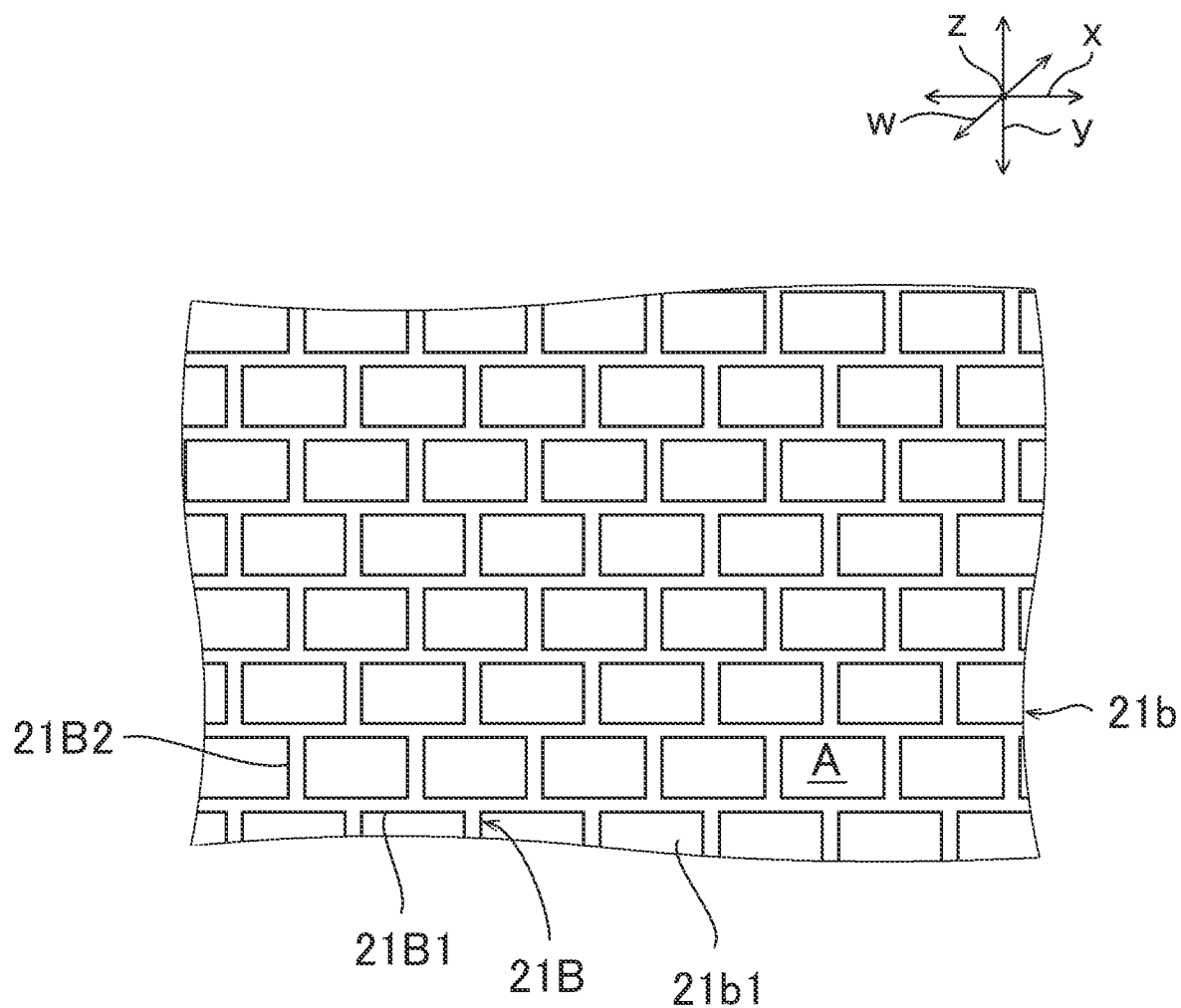
FIG. 4 is a schematic plan view of a first main wall section in accordance with Embodiment 1.

FIG. 4 is a schematic plan view of the surface 21b1 of the first main wall section 21b in accordance with Embodiment 1. Referring to FIGS. 2 to 4, the protrusion 21B is provided in such a manner as to divide a portion of the accommodation space 21a on the side of the first main wall section 21b into a plurality of regions A.

Referring to FIG. 4, the regions A are arranged both in the x-axis direction and in the w-axis direction, like a matrix. The x-axis direction is perpendicular to the z-axis direction. The w-axis direction is inclined to both the x-axis direction and the y-axis direction and is also perpendicular to the z-axis direction. The y-axis direction is perpendicular to both the x-axis direction and the z-axis direction. In the present embodiment, the regions A are arranged in the x-axis direction, the y-axis direction, and the w-axis direction.

The present embodiment assumes, as an example, that there is provided one integrally formed protrusion 21B. Note that the disclosure is not necessarily limited to such a structure. There may be provided a plurality of protrusions in the disclosure.

The protrusion 21B includes a plurality of first protrusions 21B1 extending in the x-axis direction. Each of the first protrusions 21B1 is arranged linearly. The first protrusions 21B1 are arranged in the y-axis direction in an equidistant manner.

The protrusion 21B further includes a plurality of second protrusions 21B2. Each of the second protrusions 21B2 is arranged linearly in the y-axis direction. The plurality of second protrusions 21B2 interconnect two first protrusions 21B1 that are adjacent to each other in the y-axis direction and include the plurality of second protrusions 21B2 arranged in the x-axis direction. The second protrusion 21B2 that connects one first protrusion 21B1 to a first protrusion 21B1 positioned on a side of the one first protrusion 21B1 with respect to the y-axis direction is disposed in a different location with respect to the x-axis direction from the second protrusion 21B2 that connects one first protrusion 21B1 to a first protrusion 21B1 positioned on the other side of the one first protrusion 21B1 with respect to the y-axis direction.

Dispersion Medium 22

The dispersion medium 22 shown in FIG. 2 is contained inside the accommodation space 21a. The dispersion medium 22 is a medium in which the particles 23 can be dispersed. The dispersion medium 22 is not limited in any particular manner so long as the dispersion medium 22 allows dispersion of the particles 23. The dispersion medium 22 is preferably in liquid form. The dispersion medium 22 may include, for example, an aqueous or non-aqueous liquid. Specifically, the dispersion medium 22 may be, for example, oil, water, an aqueous solution, alcohol, linear or cyclic saturated or unsaturated hydrocarbon, ether, or ionic liquid. Specific examples the dispersion medium 22 include silicone oil, water, ethanol, propanol, butanol, ethylene glycol, propylene glycol, pentane, hexane, heptane, octane, nonane, decane, dodecane, toluene, xylene, and THF. Any one of these materials may be used alone; alternatively, any two or more of them may be used in mixture.

Note that the accommodation space 21a is preferably filled with the dispersion medium 22. In other words, the accommodation space 21a preferably contains substantially no gas therein.

Particles 23

The particles 23 reside in the accommodation space 21a. The particles 23 are dispersed in the dispersion medium 22. To describe it in detail, the particles 23 are dispersed in the dispersion medium 22 when the aggregation section 24 is not driven.

The particles 23 are not limited in any particular manner so long as the particles 23 can be aggregated by the aggregation section 24 (described later in detail). The particles 23 may be capable of being aggregated by, for example, receiving electric, magnetic, optical or thermal energy. Throughout the following description, the present embodiment assumes, as an example, that the particles 23 include a plurality of charged particles that can be aggregated under applied voltage. Note that an example of the particles 23 that can be aggregated in an applied magnetic field is magnetic particles.

Specifically, in the present embodiment, the particles 23 include, for example, at least one species of titanium oxide particles, carbon black particles, a complex of such particles coated with a polyethylene or like polymer, polyethylene particles, polystyrene particles, and silica particles. The particles 23 may include, for example, a single species of particles or a plurality of species (e.g., two species) of particles. The particles 23 may be either transparent or opaque.

The particles 23 may have any shape and may be, for example, spherical, spheroidal, acicular, rod-like, angular columnar, cylindrical, platelike, or flake-like. The particles 23 may include a plurality of species of particles of different shapes.

The average particle diameter of the particles 23 is, for example, preferably from 30 nm to 100 μm, more preferably from 100 nm to 20 μm, and even more preferably from 1 μm to 5 μm, all inclusive.

Note that the average particle diameter of the particles 23 can be measured using a particle size distribution measuring instrument.

The concentration of the particles 23 in the dispersion medium 22 is preferably from 1 vol % to 30 vol % and more preferably from 3 vol % to 10 vol %, all inclusive.

Aggregation Section 24

The aggregation section 24 aggregates the particles 23. The aggregation section 24 is not limited in any particular manner so long as the aggregation section 24 can aggregate the particles 23. For instance, when the particles 23 are charged particles, the aggregation section 24 preferably applies voltage to the dispersion medium 22 in which the particles 23 are dispersed.

In the present embodiment, specifically, the aggregation section 24 includes a first electrode 24a and a second electrode 24b. The first electrode 24a and the second electrode 24b face each other with the accommodation space 21a intervening therebetween. The first electrode 24a is disposed on a main face opposite from the accommodation space 21a of the first main wall section 21b of the reinforcement main body 21. The second electrode 24b is disposed on a main face opposite from the accommodation space 21a of the second main wall section 21c of the reinforcement main body 21. In the present embodiment, each of the first electrode 24a and the second electrode 24b is provided in a substantially entire area in which the accommodation space 21a is provided.

Note that both the first electrode 24a and the second electrode 24b may be made of any substance. Each of the first electrode 24a and the second electrode 24b may be made of, for example, a metal such as Al, Ag, Au, or Pt, an alloy containing at least one of these metals, or a transparent conductive oxide (TCO) such as indium tin oxide (ITO), aluminum zinc oxide (ZnO:Al (AZO)), indium zinc oxide (IZO), or $In_2O_3$-based IGO with a variable Ga content.

Power Supply 25 and Control Section 26

The first electrode 24a and the second electrode 24b are connected to the power supply 25. The power supply 25 applies voltage across the first electrode 24a and the second electrode 24b. In the present embodiment, the power supply 25 is built around a DC power supply to apply DC voltage across the first electrode 24a and the second electrode 24b.

The control section 26 is connected to the power supply 25. The control section 26 controls the voltage that the power supply 25 applies across the first electrode 24a and the second electrode 24b. In the present embodiment, specifically, the control section 26 controls turning-on/off of the voltage that the power supply 25 applies across the first electrode 24a and the second electrode 24b and also controls the value of the voltage applied across the first electrode 24a and the second electrode 24b. The control section 26 may be capable of, for example, switching between a state where the power supply 25 is applying no voltage across the first electrode 24a and the second electrode 24b and a state where the power supply 25 is applying a prescribed voltage (voltage higher than or equal to a voltage required for the particles 23 to aggregate to form the aggregation layer) across the first electrode 24a and the second electrode 24b. In addition, the control section 26 may enable the power supply 25 to apply different levels of voltage across the first electrode 24a and the second electrode 24b. The control section 26 may be capable of linearly controlling the voltage that the power supply 25 applies across the first electrode 24a and the second electrode 24b.

The control section 26 may be built around, for example, a processor.

A detailed description is given next of the display device 1 where no voltage is being applied across the first electrode 24a and the second electrode 24b and the display device 1 where a voltage is being applied across the first electrode 24a and the second electrode 24b.

Display Device 1 where No Voltage is being Applied Across First Electrode 24a and Second Electrode 24b

When no voltage is being applied across the first electrode 24a and the second electrode 24b, the particles 23 are dispersed in the dispersion medium 22 in the accommodation space 21a. Therefore, when no voltage is being applied across the first electrode 24a and the second electrode 24b, the display device 1 is flexible.

Display Device 1 where Voltage is being Applied Across First Electrode 24a and Second Electrode 24b

Figure 5:
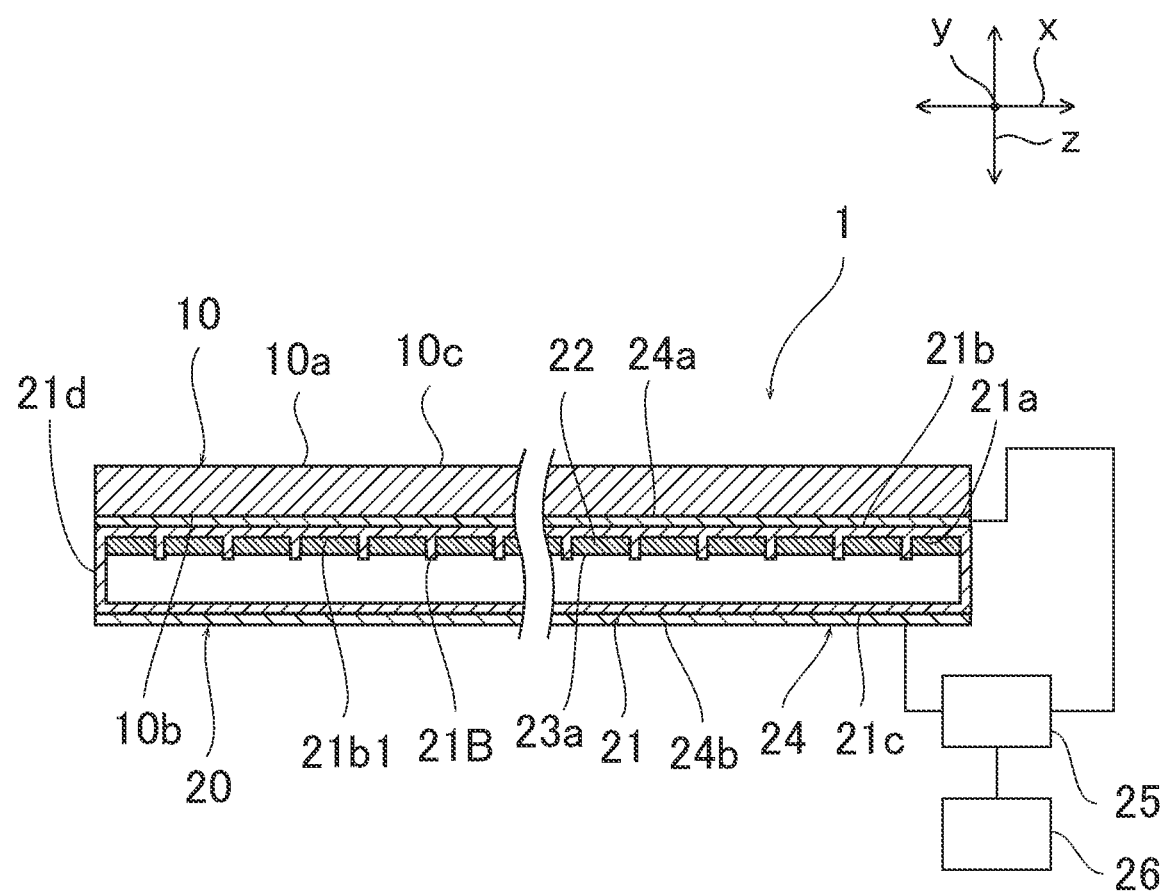
FIG. 5 is a schematic cross-sectional view of the display device in accordance with Embodiment 1 where an aggregation layer is formed.
Figure 6:
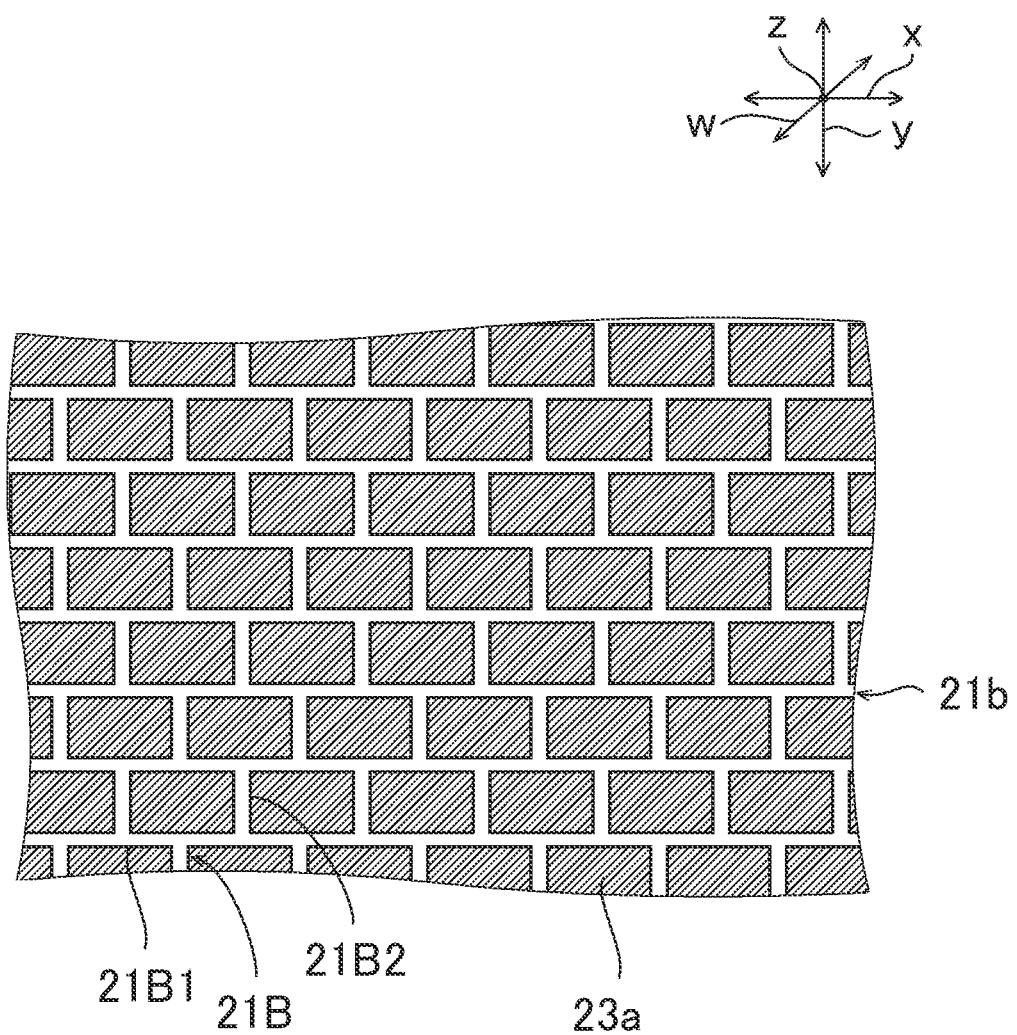
FIG. 6 is a schematic plan view of a first wall section and an aggregation layer in accordance with Embodiment 1 where the aggregation layer is formed.

FIG. 5 is a schematic cross-sectional view of the display device 1 in accordance with Embodiment 1 where an aggregation layer 23a is formed. FIG. 6 is a schematic plan view of the first main wall section 21b and the aggregation layer 23a in accordance with Embodiment 1 where the aggregation layer 23a is formed. Note that in FIG. 6, the area where the aggregation layer 23a is formed is shown in hatching for convenience of description. This hatched area does not represent a cross-section.

Referring to FIG. 5, as a voltage is applied across the first electrode 24a and the second electrode 24b, the particles 23 are aggregated to form the aggregation layer 23a inside the accommodation space 21a. Therefore, the aggregation layer 23a improves the rigidity of the display device 1. In the present embodiment, the reinforcement body 20 is structured such that the aggregation layer 23a formed by the aggregation section 24 can reinforce the flexible section 10c. Thus, although the display device 1 may lose some of the flexibility thereof, the display device 1 exhibits improved press resistance. Accordingly, the display device 1 has excellent press resistance.

With a view to further improving press resistance, the reinforcement body 20 is preferably structured such that the aggregation layer 23a is formed on the surface 21b1 of the first main wall section 21b on the side of the accommodation space 21a. Specifically, when the particles 23 include titanium oxide particles or a complex containing titanium oxide particles coated with a polymer, the power supply 25 preferably applies such a voltage across the first electrode 24a and the second electrode 24b that the first electrode 24a can act as an anode and the second electrode 24b can act as a cathode.

With a view to even further improving press resistance, the protrusion 21B is preferably provided on the surface 21b1 of the first main wall section 21b on the side of the accommodation space 21a. When the protrusion 21B is provided, since the protrusion 21B engages the aggregation layer 23a, the aggregation layer 23a can be restrained from being displaced relative to the surface 21b1 even if the display device 1 is placed under stress. Thus, even better press resistance can be achieved.

With a view to still further improving press resistance, the protrusion 21B is more preferably provided such that the protrusion 21B divides a portion of the accommodation space 21a on the side of the first main wall section 21b into the plurality of regions A.

The height $t_1$ of the protrusion 21B is preferably greater than or equal to 10 times the average particle diameter of the particles 23 and more preferably greater than or equal to 30 times that average particle diameter. In such a case, the rigidity of the aggregation layer 23a can be increased, and for this reason, even better press resistance can be achieved.

However, if the height $t_1$ of the protrusion 21B is too high, the particles 23 may not be readily re-dispersed in the dispersion medium 22 when the voltage application across the first electrode 24a and the second electrode 24b is stopped. In other words, the reversibility between the dispersed particles 23 and the aggregation layer 23a may be degraded. Therefore, the height $t_1$ of the protrusion 21B is preferably less than or equal to half of the thickness to of the accommodation space 21a ($t_1 \leq (\frac{1}{2}) \cdot t_0$) when the flexible section 10c is platelike and more preferably less than or equal to one third of that thickness to.

The location where the aggregation layer 23a is formed with respect to the z-axis direction is not limited in any particular manner. With a view to further improving press resistance, however, the aggregation layer 23a is preferably provided exactly on the surface 21b1. For instance, the power supply 25 preferably applies voltage across the first electrode 24a and the second electrode 24b in such a manner that the particles 23 can move toward the first electrode 24a under applied voltage, in order to form the aggregation layer 23a exactly on the surface 21b1.

With a view to still further improving press resistance, the particles 23 are preferably composed primarily of particles primarily of a highly rigid inorganic material. In such a case, the rigidity of the aggregation layer 23a, hence the rigidity of the display device 1, can be readily increased.

Figure 7:
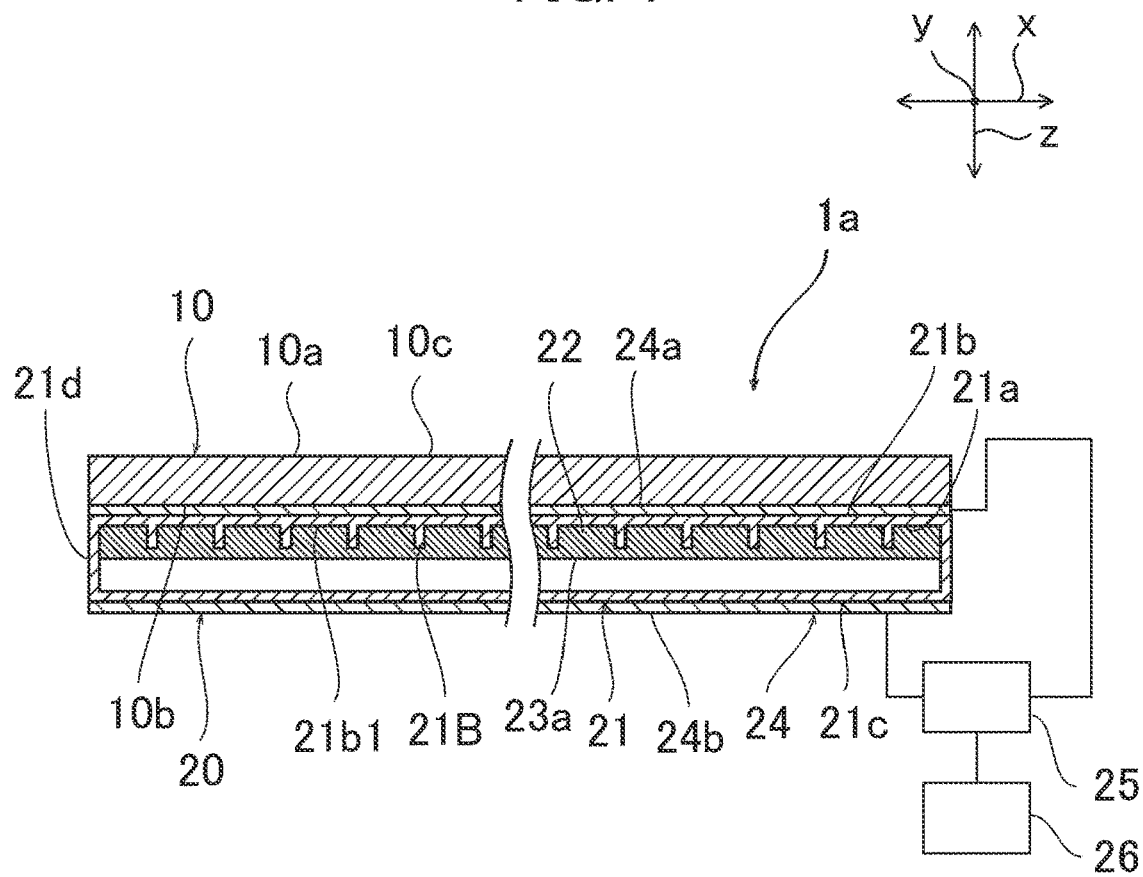
FIG. 7 is a schematic cross-sectional view of a display device in accordance with Embodiment 2.

Note that as shown in FIGS. 5 and 6, in the present embodiment, the reinforcement body 20 is structured such that individual aggregation layers 23a are formed in the respective regions A. Even in such a case, the press resistance of the display device 1 is improved if the aggregation layers 23a are provided. With a view to more efficiently improving the press resistance, for example, as in a display device 1a shown in FIG. 7, the reinforcement body 20 is more preferably structured such that the aggregation layer 23a has a larger thickness than the height $t_1$ of the protrusion 21B and is provided across the regions A.

With a view to achieving excellent press resistance, under the control of the control section 26, the power supply 25 needs only to apply, across the first electrode 24a and the second electrode 24b, a sufficiently high voltage to aggregate the particles 23, thereby forming the aggregation layer 23a. For instance, when the control section 26 can apply different levels of voltage across the first electrode 24a and the second electrode 24b, the rigidity of the aggregation layer 23a can be adjusted by controlling the magnitude of the applied voltage. Therefore, the flexibility and press resistance of the display device 1 can be controlled. With a view to enabling rigorous control of the flexibility and press resistance of the display device 1, the control section 26 more preferably can linearly control the voltage applied across the first electrode 24a and the second electrode 24b.

Press resistance is essential to any display device. The technology disclosed here is therefore suited to any type of display device. Higher levels of press resistance are often required in display devices that have a touch panel function. Accordingly, the technology disclosed here is particularly suited to display devices that have a touch panel function.

The following will describe other modes for carrying out the disclosure. Throughout the following description, the members that have substantially the same function as those in Embodiment 1 are denoted by the same reference numerals, and description thereof is omitted.

Embodiment 3

Figure 8:
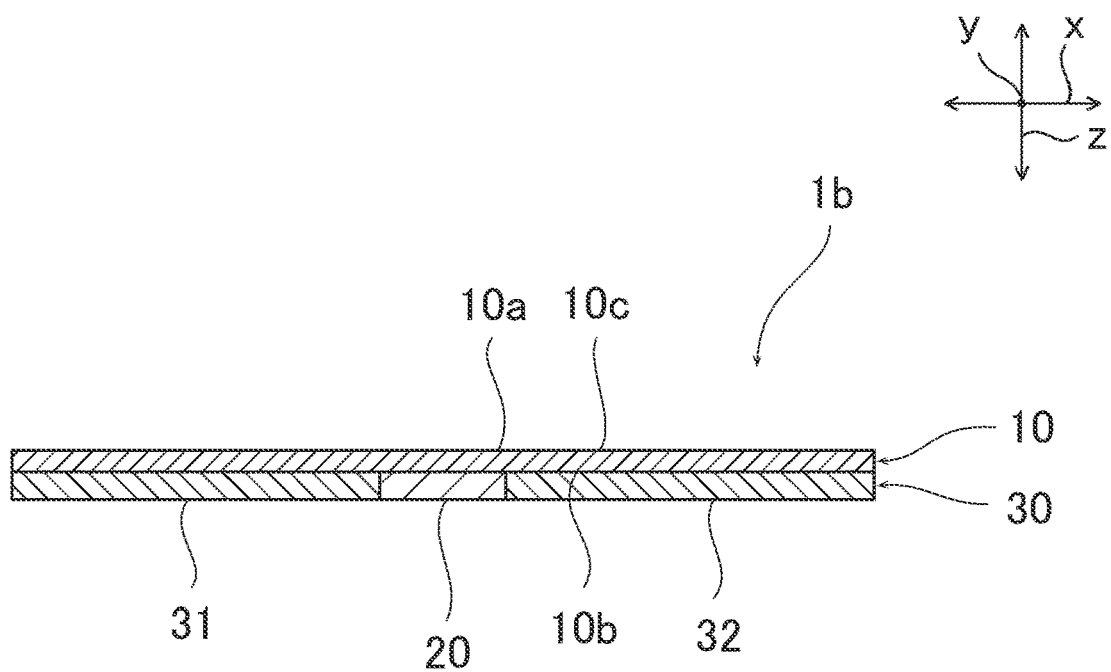
FIG. 8 is a schematic cross-sectional view of a display device in accordance with Embodiment 3.

FIG. 8 is a schematic cross-sectional view of a display device 1b in accordance with Embodiment 3.

Referring to FIG. 8, the display device 1b in accordance with Embodiment 3 differs from the display device 1 in accordance with Embodiment 1 and the display device 1a in accordance with Embodiment 2 in that the display device 1b further includes a support body 30 and that in the display device 1b, the reinforcement body 20 is only provided in a part of the display panel 10.

The support body 30 is attached to a part of the display panel 10. To describe it in detail, the support body 30 is adhered to a part of the display panel 10. The support body 30 has greater rigidity than the display panel 10. Specifically, the support body 30 includes a rigid body. Therefore, the portion of the display panel 10 to which the support body 30 is attached is less flexible than the portion thereof to which the support body 30 is not attached. There can be practical cases where the portion of the display panel 10 to which the support body 30 is attached is substantially inflexible and the portion thereof to which the support body 30 is not attached is flexible.

Note that the support body 30 may include, for example, a metal plate, a glass plate, a resin plate, or a ceramic plate.

Specifically, in the present embodiment, the support body 30 includes a first support body 31 and a second support body 32.

The first support body 31 and the second support body 32 are arranged in the x-axis direction and separated from each other by a distance. The first support body 31 is attached to the display panel 10 on one side of the reinforcement body 20 with respect to the x-axis direction. In contrast, the second support body 32 is attached to the display panel 10 on the other side of the reinforcement body 20 with respect to the x-axis direction. The reinforcement body 20 is attached to a portion of the display panel 10 that is located between the portion of the display panel 10 to which the first support body 31 is attached and the portion of the display panel 10 to which the second support body 32 is attached. Both one side of the display device 1b with respect to the x-axis direction and the other side thereof are substantially inflexible, and the portion of the display device 1b in which the reinforcement body 20 is provided, in other words, the central portion of the display device 1b with respect to the x-axis direction, is flexible.

The reinforcement body 20 is not necessarily provided across the entire display panel 10 and may be provided in a part of the display panel, as in the present embodiment. This provision of the reinforcement body 20 in at least a part of the flexible portion of the display panel 10 enables improving the press resistance of the area in which the reinforcement body 20 is provided.

Figure 9:
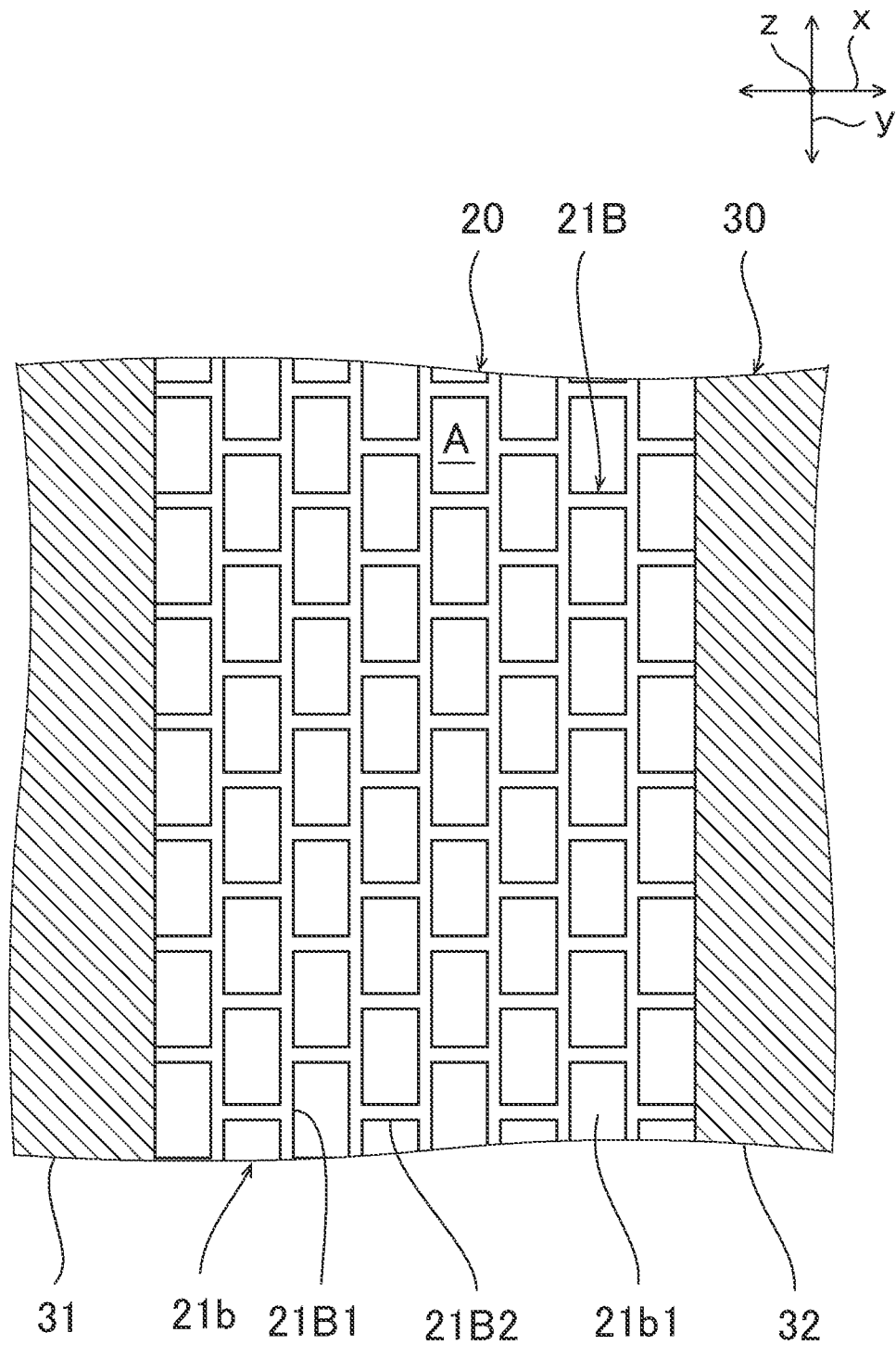
FIG. 9 is a schematic plan view of a protrusion in accordance with Embodiment 3, illustrating the shape of the protrusion as it appears in a plan view.

FIG. 9 is a schematic plan view of a protrusion 21B in accordance with Embodiment 3, illustrating the shape of the protrusion 21B as it appears in a plan view.

Referring to FIG. 9, in the present embodiment where the first support body 31 and the second support body 32 are arranged in the x-axis direction, the protrusion 21B preferably includes a plurality of first protrusions 21B1 reaching one end portion of the accommodation space 21a from the other end portion thereof with respect to the y-axis direction which is perpendicular to the x-axis direction. The provision of these first protrusions 21B1 enables efficiently restraining the aggregation layer 23a and the surface 21b1 from being displaced relative to each other. Therefore, press resistance can be more efficiently restrained.

With a view to more efficiently restraining press resistance, it is preferable that the protrusion 21B further includes a plurality of second protrusions 21B2 interconnecting those of the first protrusions 21B1 that are adjacent to each other in the x-axis direction and that those of the second protrusions 21B2 that are adjacent to each other in the x-axis direction are disposed in different locations with respect to the y-axis direction.

Embodiment 4

Figure 10:
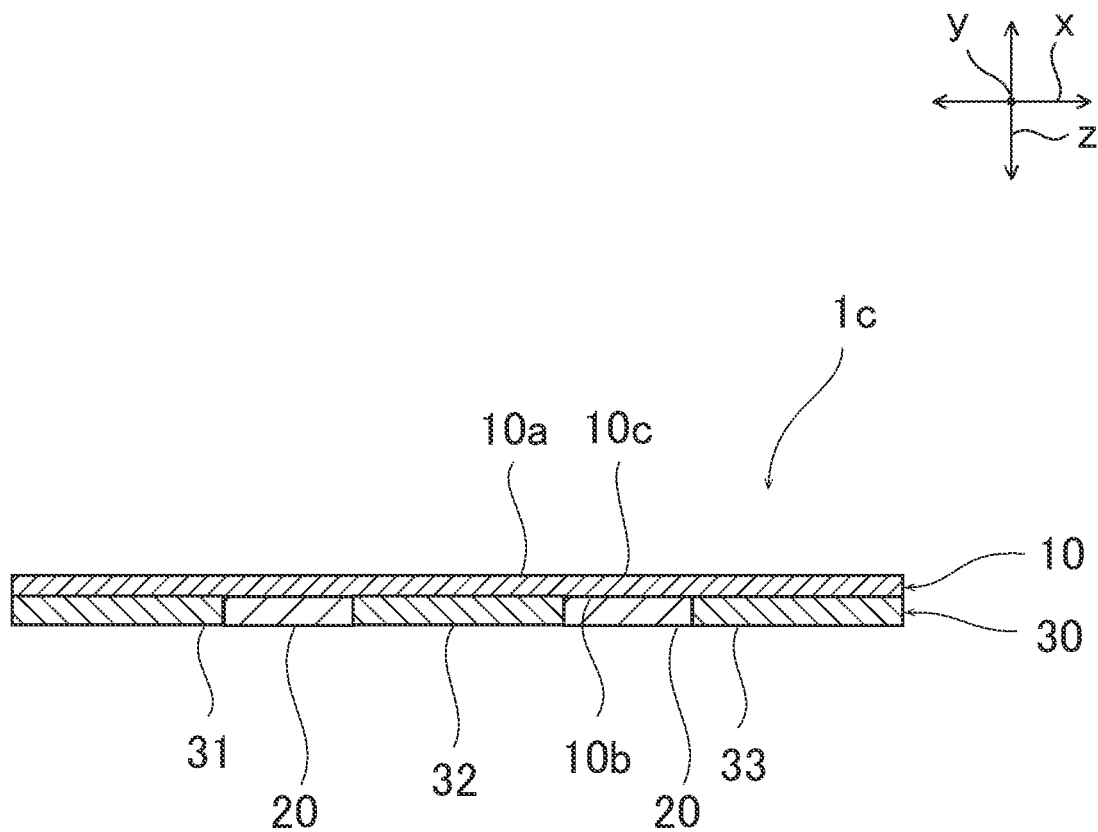
FIG. 10 is a schematic cross-sectional view of a display device in accordance with Embodiment 4.

FIG. 10 is a schematic cross-sectional view of a display device 1c in accordance with Embodiment 4.

Embodiment 3 has discussed an example where the display device 1b includes two support bodies 31 and 32. The disclosure is however not limited to this structure. In the disclosure, the display device may include one support body, two support bodies, or three or more support bodies.

Referring to FIG. 10, the display device 1c in accordance with Embodiment 4 includes three support bodies 31, 32, and 33. Even when this is the case, the reinforcement body 20 is provided in at least a part of the portion of the display panel 10 in which none of the support bodies 31, 32, and 33 are provided. Accordingly, the display device 1c can have excellent press resistance.

Embodiments 5 to 7

Figure 11:
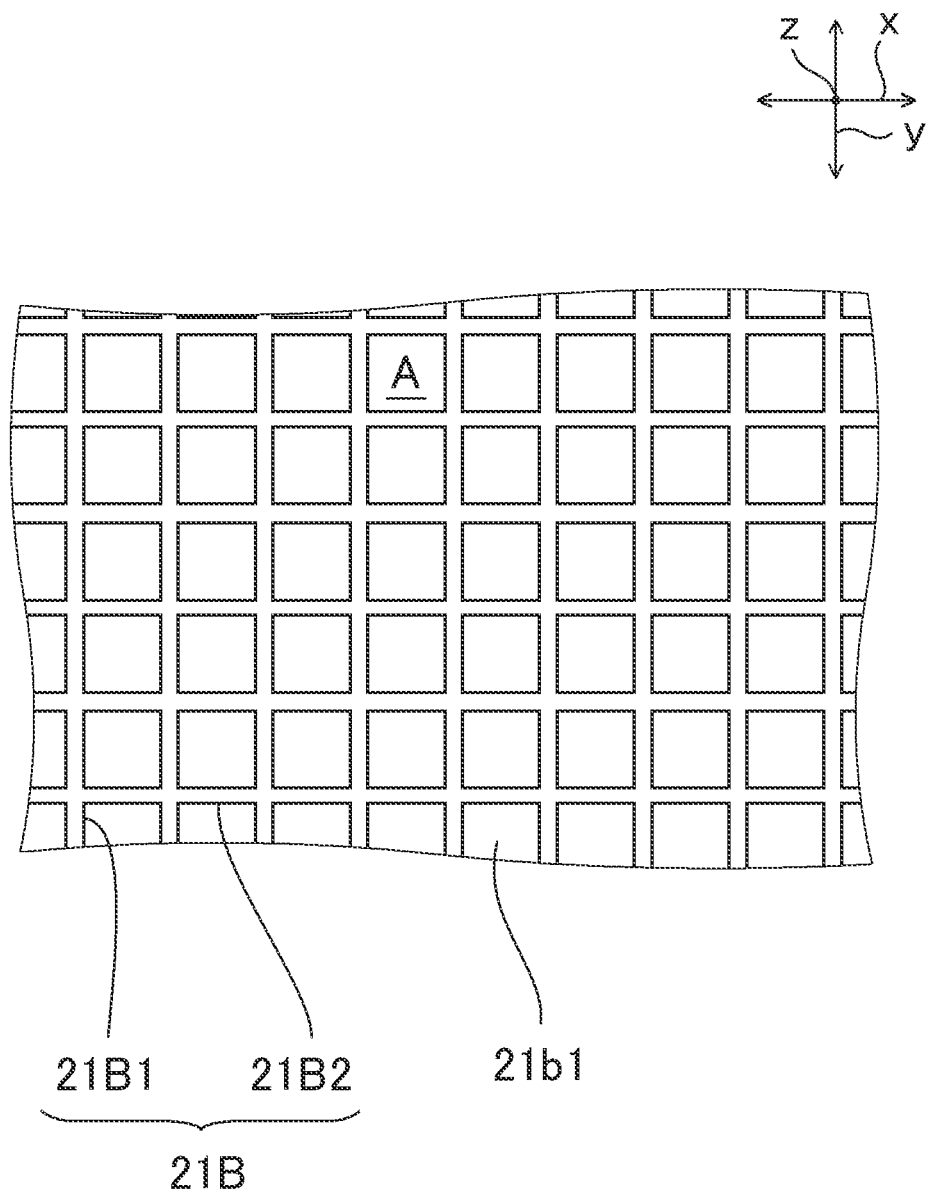
FIG. 11 is a schematic plan view of a protrusion in accordance with Embodiment 5, illustrating the shape of the protrusion as it appears in a plan view.
Figure 12:
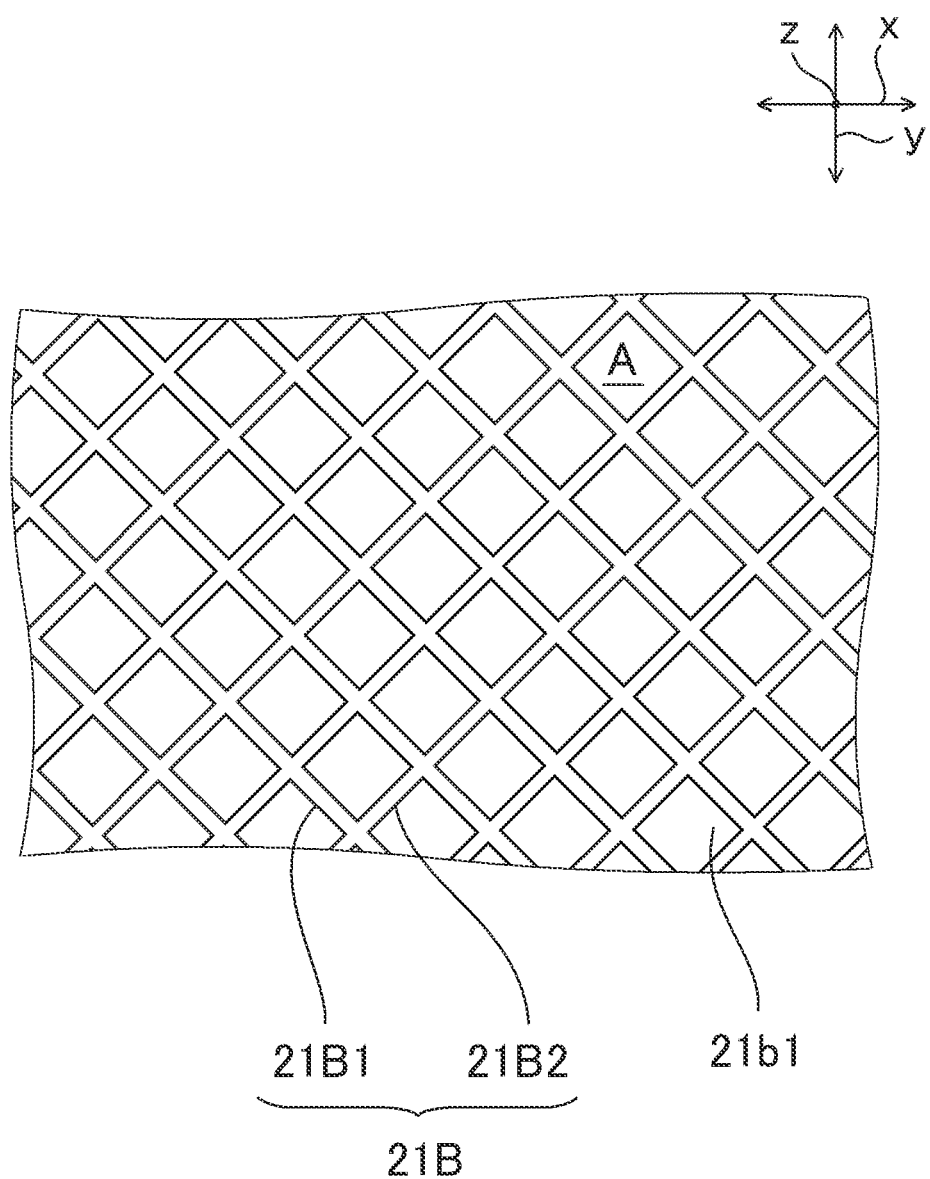
FIG. 12 is a schematic plan view of a protrusion in accordance with Embodiment 6, illustrating the shape of the protrusion as it appears in a plan view.
Figure 13:
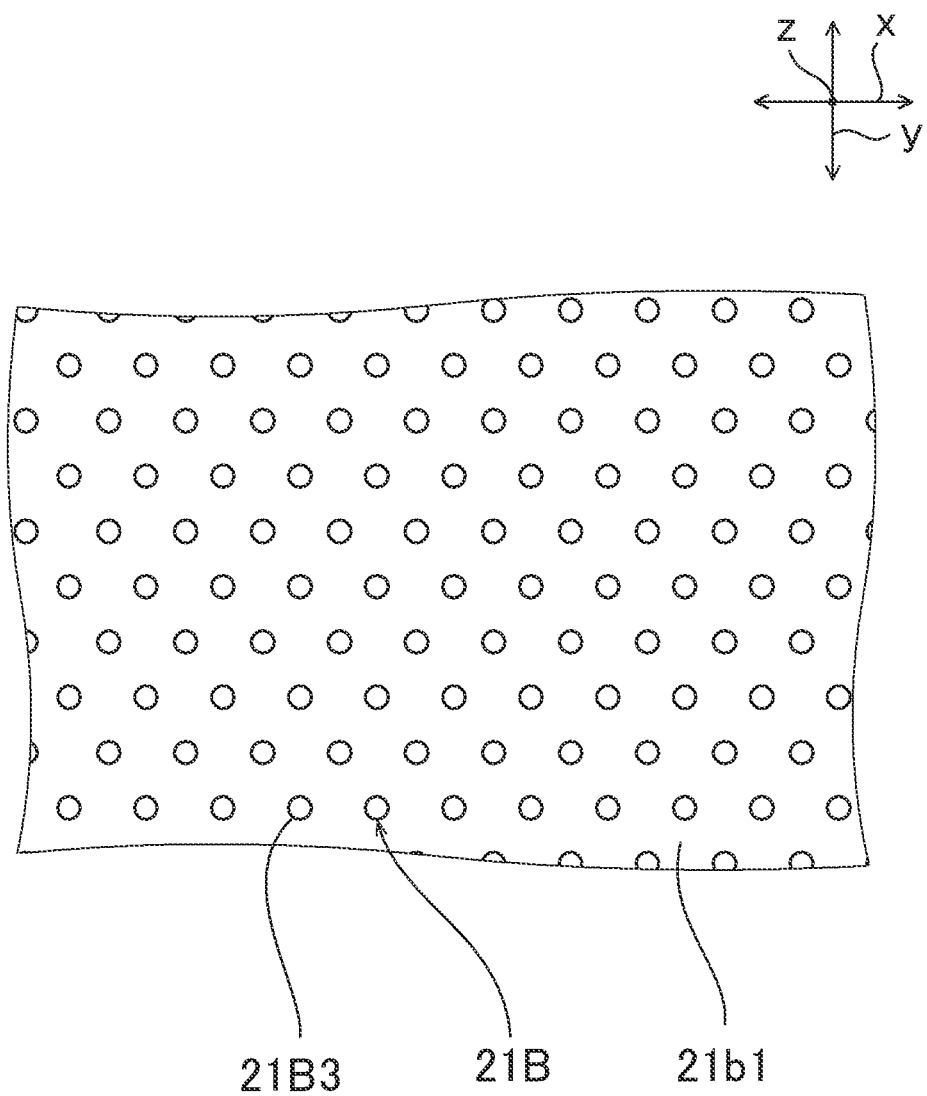
FIG. 13 is a schematic plan view of a protrusion in accordance with Embodiment 7, illustrating the shape of the protrusion as it appears in a plan view.

FIG. 11 is a schematic plan view of a protrusion 21B in accordance with Embodiment 5, illustrating the shape of the protrusion 21B as it appears in a plan view. FIG. 12 is a schematic plan view of a protrusion 21B in accordance with Embodiment 6, illustrating the shape of the protrusion 21B as it appears in a plan view. FIG. 13 is a schematic plan view of a protrusion 21B in accordance with Embodiment 7, illustrating the shape of the protrusion 21B as it appears in a plan view.

The aforementioned embodiments have discussed one exemplary shape of protrusions. However, in the disclosure, the protrusions do not necessarily have the shape described in the aforementioned embodiments.

Referring to FIG. 11, the protrusion 21B may be arranged, for example, in a lattice. In Embodiment 5 shown in FIG. 11, the protrusion 21B includes: a plurality of first protrusions 21B1 extending in the y-axis direction and arranged in the x-axis direction in an equidistant manner; and a plurality of second protrusions 21B2 extending in the x-axis direction and arranged in the y-axis direction in an equidistant manner. The first protrusions 21B1 intersect with the second protrusions 21B2.

Note that the regions A are rectangular in the embodiment shown in FIG. 11, but may be, for example, hexagonal or otherwise polygonal, circular, elliptical, or elongated circular.

Referring to FIG. 12, the protrusion 21B may be arranged, for example, in an oblique lattice. In Embodiment 6 shown in FIG. 12, the protrusion 21B includes a plurality of first protrusions 21B1 and a plurality of second protrusions 21B2 that are inclined to the x-axis direction and the y-axis direction respectively. The first protrusions 21B1 intersect with the second protrusions 21B2 (typically, at 90 degrees).

Referring to FIG. 13, the protrusion 21B includes a matrix of dot-like protrusions 21B3. The protrusions 21B3 are arranged in an oblique matrix, but may be arranged in an upright matrix.

Even when the protrusion 21B shaped as shown in, for example, FIGS. 11 to 13 is provided, the provision of the protrusion 21B enables improving the press resistance of the display device.

Other Embodiments

The aforementioned embodiments have discussed examples where the aggregation layer 23a is formed when voltage is applied across the first electrode 24a and the second electrode 24b, and the particles 23 are dispersed when no voltage is applied.

The aforementioned embodiments have additionally discussed examples where the aggregation section 24 aggregates the particles 23 when the accommodation space 21a is under applied voltage. However, in the disclosure, the particles 23 may be aggregated by any method.

For instance, a plurality of particles 23 that are aggregated in a magnetic field may be dispersed in the dispersion medium 22, and the aggregation section 24 may include a member that applies a magnetic field to the accommodation space 21a (e.g., a coil). In such a case, the particles 23 are preferably composed primarily of, for example, magnetic particles such as iron particles.

The surface 21b1 of the first main wall section 21b may be irregular. When this is the case, anchoring effect is enhanced between the surface 21b1 and the aggregation layer 23a. That in turn enables further improving press resistance.

The aforementioned embodiments have discussed examples where the protrusion 21B is provided on the surface 21b1 of the first main wall section 21b on the side of the accommodation space 21a. However, in the disclosure, the protrusion is not necessarily provided. In the disclosure, no protrusion needs to be formed on the surface of the first main wall section on the side of the accommodation space.

The invention claimed is:

1. A display device comprising: a display panel including in at least a part thereof a flexible section that is flexible; and a reinforcement body attached to the flexible section, wherein the reinforcement body includes: a reinforcement main body that is flexible, the reinforcement main body having an accommodation space overlapping the flexible section; a dispersion medium contained in the accommodation space; a plurality of particles dispersed in the dispersion medium; and an aggregation section that aggregates the plurality of particles so as to form an aggregation layer in the accommodation space, wherein the plurality of particles is charged particles, and the aggregation section includes: a first electrode and a second electrode facing each other with the accommodation space intervening therebetween; and a power supply that applies voltage across the first electrode and the second electrode.

2. The display device according to claim 1, wherein the reinforcement body is structured such that the aggregation layer formed by the aggregation section reinforces the flexible section.

3. The display device according to claim 1, wherein
   the reinforcement main body includes:
   a first wall section along the flexible section; and
   a second wall section facing the first wall section with the accommodation space intervening therebetween, and
   the first wall section has a protrusion on a surface thereof on a side of the accommodation space, the protrusion protruding toward the second wall section.

4. The display device according to claim 3, wherein the protrusion is provided so as to divide a portion of the accommodation space on a side of the first wall section into a plurality of regions.

5. The display device according to claim 4, wherein the reinforcement body is structured so as to provide the aggregation layer in each of the plurality of regions.

6. The display device according to claim 3, wherein the protrusion has a height less than or equal to half of a thickness of the accommodation space when the flexible section is platelike.

7. The display device according to claim 3, wherein the protrusion has a height greater than or equal to 10 times an average particle diameter of the plurality of particles.

8. The display device according to claim 3, further comprising: a first support body attached to the display panel on one side of the reinforcement body with respect to a first direction; and a second support body attached to the display panel on another side of the reinforcement body with respect to the first direction.

9. The display device according to claim 8, wherein the protrusion includes a plurality of first protrusions reaching one end portion of the accommodation space from another end portion thereof with respect to that is a second direction perpendicular to the first direction.

10. The display device according to claim 9, wherein
    the protrusion further includes a plurality of second protrusions interconnecting those of the plurality of first protrusions that are adjacent to each other in the first direction, and
    those of the plurality of second protrusions that are adjacent to each other in the first direction are disposed in different locations with respect to the second direction.

11. The display device according to claim 9, wherein the protrusion further includes a plurality of second protrusions extending in a direction that intersects with the plurality of first protrusions.

12. The display device according to claim 1, wherein the aggregation section further includes a control section that controls the voltage that the power supply applies across the first electrode and the second electrode, and the control section is capable of applying different levels of voltage across the first electrode and the second electrode.

13. The display device according to claim 12, wherein the control section is capable of linearly controlling the voltage applied across the first electrode and the second electrode.

14. The display device according to claim 1, wherein the charged particles include at least one of titanium oxide particles, carbon black particles, polyethylene particles, polystyrene particles, and silica particles.

15. The display device according to claim 1, wherein the dispersion medium contains at least one of silicone oil, water, ethylene glycol, propylene glycol, and decane.

* * * * *